United States Patent [19]

Desai et al.

[11] 4,098,091
[45] Jul. 4, 1978

[54] RISER GUIDE MEMBER

[75] Inventors: Ardeshir R. Desai; Dayton M. Simpson, both of Houston, Tex.

[73] Assignee: Brown & Root, Inc., Houston, Tex.

[21] Appl. No.: 820,777

[22] Filed: Aug. 1, 1977

[51] Int. Cl.² .............................................. F16L 1/04
[52] U.S. Cl. ...................................... 61/110; 61/100
[58] Field of Search ................ 61/102, 107, 109, 110, 61/111, 100; 166/0.5, 0.6

[56] References Cited

U.S. PATENT DOCUMENTS

| | | | |
|---|---|---|---|
| 3,434,296 | 3/1969 | Otteman et al. | 61/110 |
| 3,546,889 | 12/1970 | Hemphill et al. | 61/110 |
| 3,595,312 | 7/1971 | Matthews | 61/110 X |
| 3,868,826 | 3/1975 | Landers | 61/102 |
| 4,023,371 | 5/1977 | Bryant | 61/110 |

Primary Examiner—Paul R. Gilliam
Assistant Examiner—David H. Corbin
Attorney, Agent, or Firm—Kenway & Jenney

[57] ABSTRACT

A guide member having the advantage of the "J-tube" and "bending shoe" risers, for installing a riser pipeline between a submerged pipeline and an above water facility of an offshore apparatus, is disclosed. The guide member has a J-shape and has three sections: a long, tubular, vertically extending upper section, a short, tubular, substantially horizontal lead-in section, and a curved channel section extending between the upper and lead-in sections. The curved channel section is open on a side away from the lead-in section. The resulting guide member requires a substantially smaller pulling force than would be required with a comparable J-tube riser and avoids the manipulative complications of conventional "bending shoe" risers.

6 Claims, 9 Drawing Figures

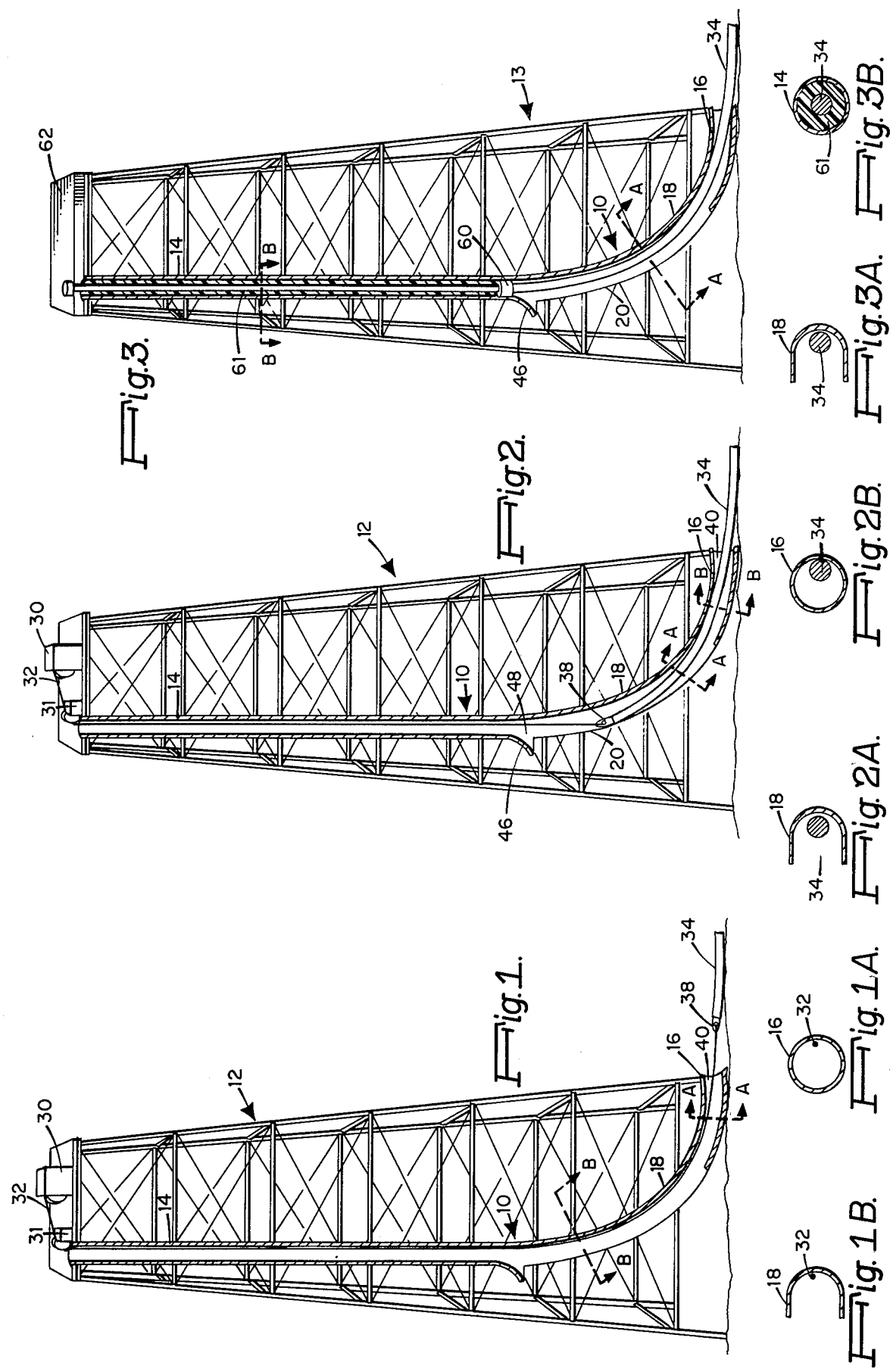

RISER GUIDE MEMBER

This invention relates to means for connecting an above water facility of an offshore apparatus to an underwater pipeline and in particular relates to apparatus for guiding a pipeline member as it is pulled through a guide member from the bottom of a body of water to the above water facility.

BACKGROUND OF THE INVENTION

The offshore drilling industry is constantly striving and searching for increased oil production. In pursuing that interest, offshore apparatus have been erected and wells drilled in ever deeper waters. In addition, the offshore oil drilling industry is using larger diameter pipelines to obtain large production rates and to reduce the cost per gallon of oil.

A problem common to all offshore apparatus is providing the connection from an above water facility to a pipeline which lies on the bottom of a body of water. One typical method of providing the connection is the use of a "J-tube" riser guide member which is a continuous tubular structure having the shape of a "J" and through which a riser pipeline is pulled from the bottom of a body of water to the above water facility. The thus pulled pipeline portion, i.e., the riser, provides the fluid flow path from the above water facility to the pipeline at the bottom of a body of water. (See, for example, the discussion in Matthews, Jr., U.S. Pat. No. 3,595,312, issued July 27, 1971.)

The "J-tube" riser is useful for riser pipeline diameters up to about 12 inches. For riser pipelines having a diameter greater than 12 inches, the high pulling force required to install the riser is a major deterrent to further use of the "J-tube" riser. On the other hand, the "J-tube" riser does have the advantage of a controlled and simple installation process which does not require elaborate pipeline manipulating equipment.

For pipeline diameters greater than 12 inches, a "bending shoe" riser guide member, as shown for example in Broussard et al., U.S. Pat. No. 3,466,882, issued Sept. 16, 1969, can be used. This riser installation device has been used for large diameter riser pipelines because it does not require the large pulling force of the J-tube riser, and therefore can more easily and readily be used with larger pipe diameters. On the other hand, the bending shoe riser has a major disadvantage because it requires an elaborate and precise installation procedure which necessitates the use of complex instrumentation and hardware. This is especially important at deeper water depths.

It is therefore an object of the present invention, to provide a new riser guide member which has the advantages of both the conventional "J-tube" riser and the "bending shoe" riser without having the disadvantages of either. In this sense, a synergistic result is obtained. Other objects of the invention are to provide a riser guide member which is simple and easy to use, which does not require unusually large pulling forces, which does not require elaborate and precise installation procedures, which does not require complex instrumentation and hardware, and which provides for a stable and controlled riser installation.

SUMMARY OF THE INVENTION

The invention relates to apparatus for connecting a pipeline lying on the bottom of a body of water to an above water facility of an offshore apparatus. It features a J-shaped riser guide member having three sections. The first and upper section is a long tubular, vertically extending section. The lower or bottom section is a short tubular, substantially horizontal lead-in section which may, in a preferred embodiment, have an outwardly diverging or flared opening in order to provide easier lead-in of an incoming pipe. The third section, between the vertically extending section and the substantially horizontal lead-in section is a curved channel section which connects and is integral with the other two sections and which is open on a side away from the lead-in member. The J-shaped member is secured to the offshore apparatus and the lead-in section is positioned substantially at the bottom of a body of water. The apparatus also includes a pipeline pulling apparatus for pulling a pipeline through the J-shaped member starting at the lead-in section. The result is an apparatus whereby the pipeline can be pulled through the J-shaped member with a pulling force which is less than that required for a J-shaped member which has a tubular cross section for its entire length.

In preferred embodiments of the invention, the bottom of the vertically extending upper section, at the channel section, has a bell mouth to aid in guiding the pulled riser pipeline through the guide member.

DESCRIPTION OF THE DRAWINGS

Other objects, features and advantages of the invention will appear from the following description of a preferred embodiment of the invention taken together with the drawings in which:

FIG. 1 is an elevation view of the apparatus according to the invention preparatory to pulling a riser pipeline through the J-shaped guide member;

FIGS. 1A and 1B are section views taken respectively along A—A and B—B of FIG. 1;

FIG. 2 is an elevation view of a riser pipeline partially pulled through the J-shaped guide member according to the invention;

FIGS. 2A and 2B are section views taken respectively along A—A and B—B of FIG. 2;

FIG. 3 is an elevation view of an offshore apparatus with the riser pipeline in place within the J-shaped guide member; and FIGS. 3A and 3B are section views taken respectively along A—A and B—B of FIG. 3.

DESCRIPTION OF A PREFERRED EMBODIMENT

Referring to FIG. 1, the invention comprises a J-shaped riser guide member 10 attached to the jacket 12 of what will become an offshore apparatus 13 (FIG. 3). J-shaped member 10 has three sections, an upper section 14 which is a long, substantially vertically oriented, tubular section having, in the preferred embodiment, a circular cross section as shown in FIG. 3B; a substantially horizontally oriented tubular lead-in section 16; and a curved channeled section 18 which is downwardly open on a side 20 of section 18 which is away from the lead-in section 16. FIG. 1B shows a preferred cross section for channeled section 18. The three sections of member 10 may be formed from a single length of tubing; however, they may also be individually fabricated and thereafter connected, for example by welding, to form an integral structure. The sections 14, 16, 18 may also be fabricated in other ways known in the art to form an integral structure.

J-shaped member 10 may be attached to jacket 12 in any convenient way known to those skilled in the art. One preferred method and structure is to attach member 10 to jacket 12 prior to floating jacket 12 to the offshore location. Another method and structure is described in Broadway et al., U.S. Pat. No. 3,503,218, issued Mar. 31, 1970.

Apparatus 13 is provided with a pipeline pulling device comprising a winch 30 and a roller guide assembly 31. Winch 30 is capable of supplying sufficient tension to a cable 32 to pull a riser pipeline member 34 (a) into the lead-in section 16 of J-shaped member 18, (b) around the bend or curve of channeled section 18 and (c) through the guiding control of upper section 14.

Cable 32 is attached to pipeline 34 by a cable attachment member 38 which may be for example a pad eye suitably connected, for example by welding, to pipeline 34. As cable 32 is tensioned thereby pulling pipeline 34, the pipeline enters a lead-in opening 40 of lead-in section 16. Preferably lead-in opening 40 is flared outwardly to aid in guiding pipeline 34 into the lead-in section. Referring to FIG. 2, the pipeline 34 is shown approximately two-thirds the distance around the curved channel section 18. As noted previously, side 20 of curved channel section 18 is removed as indicated by the dashed line, and therefore, the leading end of pipeline 34 does not make substantial frictional contact with member 10 as it is pulled through section 18. Correspondingly, the force required to pull riser pipeline 34 through the J-shaped guide member 10 is reduced. FIGS. 2A and 2B show the pipeline in the curved channel and the lead-in channel respectively.

Tensioned cable 32 thus pulls pipeline 34 around the curved section 18 toward the substantially vertically oriented upper tubular section 14. A bell mouth 46 is provided at the bottom of upper section 18 to guide the leading end of pipeline 34 into section 14. This avoids problems due to misalignment between the leading end of pipeline 34 and the interior of substantially vertical tubular section 14, due for example, to residual curvature of the pipe line 34.

After the pipeline has entered a lower portion 48 of upper section 14, the pipeline is continually pulled until the leading end of pipeline 34 reaches an above water location near winch 30.

Referring to FIGS. 3, 3A, and 3B, the pipeline 34 is in place in the J-shaped riser guide member 10. After the pipeline has been pulled through to the position shown in FIG. 3, a plug 60 preferably provides a fluid tight seal between upper substantially vertical section 14 and channel section 18. Plug 60 may be positioned in any of a number of ways known in the art. Thus plug 60 may be an inflatable member which is placed over the riser pipeline and is inflated after the pipeline has been pulled through the guide member. Alternately, plug 60 may be a rigid member, for example neoprene, which is located on the pipeline so that it forms a press fit with section 14 as the leading end of the pipeline reaches the above water platform. In the latter case, the inside diameter of lead-in section 16 is made slightly larger than the inside diameter of tubular section 14.

After the plug seal is in place, the space between the inner surface of upper section 14 and the outer surface of pipeline 34 may be filled with a hardenable material 61, for example, grout. Once hardened, the grout holds the pipe in position and prevents the further movement of pipeline 34 in section 14. In addition the hardenable material also inhibits corrosion of that portion of riser pipeline 34 which is within upper section 14. Thereafter, a deck section 62 is provided to complete the base structure of the offshore platform.

The riser installation described above uniquely combines the advantages of the "J-shoe" and "bending shoe" risers, while not having the disadvantages of either. Thus, the apparatus according to the present invention can be used to pull pipelines having diameters much larger than used with the conventional "J-shoe" riser while at the same time requiring much less pulling force. For example, to install a 30 inch O.D. pipe in 1000 feet of water using a 48 inch I.D. J-tube, the component of pulling force required to bend the pipe and overcome friction is approximately 270 KIPS. Using the present invention, this force component is believed to be reducible to about 150 KIPS, a reduction of over 44%.

It is important in the present invention to include upper section 14 of J-shaped member 10 as an integral part of the guide member because it provides needed stability and controllability as the pipeline is pulled through the transition stage when it leaves the curved channeled member and is directed substantially vertically upward.

UNOBVIOUSNESS AND SUMMARY OF MAJOR ADVANTAGES

Various riser pipeline guiding configurations have been suggested previously. Thus, for example Otteman et al, U.S. Pat. No. 3,434,296, issued Mar. 25, 1969, describes a guide member 20 which has a large entrance opening through which a pipeline 23 is pulled in order to make the bend from a substantially horizontal direction at the bottom of a body of water to a substantially vertical direction adjacent to offshore apparatus. Otteman et al. state at column 3, lines 39–43 that the flowline guide member "may take other forms. For example, it may take the form of an inverted curved channel, arcuately spaced rollers, or other forms without departing from the invention." But even if the Otteman et al. guide member 20 were in the form of an "inverted curved channel," it would still lack the tubular lead-in section and the tubular guide structure of the upper section of the present invention which applicants find necessary in order to properly control the movement of pipe from the bottom of a body of water to the above surface platform of the offshore apparatus. Thus sections 14 and 16 of the present invention provide the control and stability necessary for relatively simple and easy installation of the riser pipeline. The embodiment shown in FIGS. 1–4 of Otteman et al., to which the statement at column 3, lines 39–43 relates, does not teach, suggest, or disclose the use of a tubular upper section or lead-in section in combination with an inverted curved channel. Furthermore, with respect to Otteman et al.'s FIG. 6, which includes a tubular upper section connected to the lead-in section, there is no teaching, suggestion, or disclosure of the desirability or need of an inverted curved channel as a portion of the guide member.

To provide the inverted curved channel structure to the embodiment of Otteman et al.'s FIG. 6 would be antithetical to the Otteman et al. disclosure wherein the tubular pipe 45 acts as a protector and guide for the riser pipeline. An open structure would not serve the same purpose.

Apparatus constructed according to the present invention provides the advantages of the "J-tube" structure and the "bending shoe" structure without the disadvantages of either.

The resulting apparatus according to the invention advantageously requires smaller pulling forces than the "J-tube" structure and is useful with relatively large pipe diameters. The invention also advantageously provides a relatively simple means of providing a riser pipeline member having a large diameter, at depths up to and exceeding 1000 feet.

Those familiar with this disclosure and skilled in the art may recognize additions, deletions, subtractions, and other modifications in addition to those herein suggested, all of which would be deemed to fall within the scope of the invention as set forth in the appended claims.

What is claimed is:

1. Apparatus for guiding installation of a riser member which connects an underwater pipeline lying substantially on the bottom of a body of water to an above water facility of an offshore apparatus comprising
   a J-shaped riser guide member having a long tubular, vertically extending upper section, a short tubular substantially horizontal lead-in section, and a curved channel section connecting said vertical section and said lead-in section, said curved channel section being open on a side away from the lead-in section,
   means for securing said J-shaped member to said offshore apparatus, said lead-in section being positioned substantially at the bottom of said body of water, and
   a pipeline pulling apparatus for pulling a riser pipeline through said J-shaped member starting at said lead-in section,
   whereby said pipeline pulling apparatus requires less pulling force than would be required if said J-shaped member were a tubular member for its entire length,
   said lead-in section provides initial control and guidance during riser installation, and
   said upper section provides stabilizing control of said riser during installation as said riser leaves said curved channel section.

2. The apparatus of claim 1 wherein said vertically extending upper section, at an end near the channel section, has a bell mouth to aid in guiding said pipeline when it is being pulled.

3. Apparatus for connecting an underwater pipeline lying substantially on the bottom of a body of water to an above water facility of an offshore apparatus comprising
   a J-shaped riser guide member having a long tubular, vertically extending upper section, a short tubular substantially horizontal lead-in section, and a curved channel section connecting said vertical section and said lead-in section, said curved channel section being open on a side away from the lead-in section,
   means for securing said J-shaped member to said offshore apparatus with said lead-in section being positioned substantially at the bottom of said body of water,
   a riser pipeline contained longitudinally within said J-shaped riser guide member,
   a plug at the bottom of said vertically extending upper section between an exterior wall of said riser pipeline and an interior wall of said vertically extending section, and
   a hardenable material between the exterior wall of said riser pipeline and the interior wall of said vertical section for encasing a portion of said riser pipeline in said vertically extending upper section,
   whereby a pipeline pulling apparatus requires less pulling force than would be required if said J-shaped member were a tubular member for its entire length,
   said lead-in section provides initial control and guidance during riser installation,
   said upper section provides stabilizing control of said riser during installation as said riser leaves said curved channel section, and
   said upper section is sealed against the corrosion and wearing effects of the water environment.

4. The apparatus of claim 3 wherein said plug is comprised of a flexible, deformable material and said hardenable material is grout.

5. The apparatus of claim 3 wherein said plug is neoprene.

6. The apparatus of claim 3 wherein said plug is comprised of a flexible material and wherein said plug is inflatable.

* * * * *